(12) United States Patent
Liu et al.

(10) Patent No.: US 9,368,108 B2
(45) Date of Patent: Jun. 14, 2016

(54) SPEECH RECOGNITION METHOD AND DEVICE

(71) Applicant: Huawei Technologies Co., Ltd., Shenzhen, Guangdong (CN)

(72) Inventors: Change Liu, Beijing (CN); Deming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/598,602

(22) Filed: Jan. 16, 2015

(65) Prior Publication Data
US 2015/0134332 A1     May 14, 2015

Related U.S. Application Data

(63) Continuation of application No. PCT/CN2013/074934, filed on Apr. 28, 2013.

(30) Foreign Application Priority Data

Sep. 26, 2012   (CN) .......................... 2012 1 0363804

(51) Int. Cl.
*G10L 15/00*     (2013.01)
*G10L 15/18*     (2013.01)
(Continued)

(52) U.S. Cl.
CPC ................ *G10L 15/06* (2013.01); *G10L 15/18* (2013.01); *G10L 15/187* (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| 2003/0004730 A1 | 1/2003 | Yuschik |
| 2004/0193416 A1* | 9/2004 | Emonts ................. G10L 15/187 704/251 |

(Continued)

FOREIGN PATENT DOCUMENTS

| CN | 101645270 A | 2/2002 |
| CN | 101169684 A | 4/2008 |

(Continued)

OTHER PUBLICATIONS

Gwenole Lecorve, et al., "An Unsupervised Web-Based Topic Language Model Adaptation Method," Acoustics, Speech and Signal Processing 2008, IEEE International Conference, Piscataway, NJ, pp. 5081-5084.

(Continued)

*Primary Examiner* — Jesse Pullias

(57) ABSTRACT

A speech recognition method and device are disclosed. The method includes: acquiring a text file specified by a user, and extracting a command word from the text file, to obtain a command word list; comparing the command word list with a command word library, to confirm whether the command word list includes a new command word; if the command word list includes the new command word, generating a corresponding new pronunciation dictionary; merging the new language model into a language model library; and receiving speech, and performing speech recognition on the speech according to an acoustic model, a phonation dictionary, and the language model library. Command words acquired online are closely related to online content; therefore, the number of the command words is limited and far less than the number of frequently used words.

14 Claims, 8 Drawing Sheets

(51) Int. Cl.
 *G10L 15/06* (2013.01)
 *G10L 15/187* (2013.01)
 *G10L 15/22* (2006.01)

(56) References Cited

U.S. PATENT DOCUMENTS

| | | | |
|---|---|---|---|
| 2006/0074669 A1* | 4/2006 | Seppala | G10L 15/193 704/257 |
| 2007/0106508 A1* | 5/2007 | Kahn | G10L 15/22 704/235 |
| 2007/0124147 A1 | 5/2007 | Gopinath et al. | |
| 2008/0059195 A1* | 3/2008 | Brown | 704/270 |
| 2008/0228480 A1 | 9/2008 | Maegawa | |
| 2009/0024392 A1 | 1/2009 | Koshinaka | |
| 2010/0169098 A1* | 7/2010 | Patch | 704/275 |
| 2010/0184011 A1* | 7/2010 | Comerford | G06N 99/005 434/321 |
| 2011/0131046 A1 | 6/2011 | Zweig et al. | |
| 2012/0041756 A1 | 2/2012 | Hanazawa et al. | |
| 2012/0095765 A1 | 4/2012 | Bodin et al. | |

FOREIGN PATENT DOCUMENTS

| | | |
|---|---|---|
| CN | 101197132 A | 6/2008 |
| CN | 101916266 A | 12/2010 |
| CN | 102280106 A | 12/2011 |
| CN | 102341843 A | 2/2012 |
| CN | 102541505 A | 7/2012 |
| CN | 102629246 A | 8/2012 |
| JP | 2004212533 A | 7/2004 |
| JP | 2010009446 A | 1/2010 |

OTHER PUBLICATIONS

Sushil Kumar Podder, et al., "Performance Improvement of Automatic Speech Recognition Systems Via Multiple Language Models Produced by Sentence-Based Clustering," Natural Language Processing and Knowledge International Conference, Oct. 26-29, 2003, Piscataway, NJ, IEEE 2003, pp. 362-367.

* cited by examiner

SPEECH RECOGNITION METHOD AND DEVICE

CROSS-REFERENCE TO RELATED APPLICATION

This application is a continuation of International Application No. PCT/CN2013/074934, filed on Apr. 28, 2013, which claims priority to Chinese Patent Application No. 201210363804.9, filed on Sep. 26, 2012, both of which are hereby incorporated by reference in their entireties.

TECHNICAL FIELD

The present invention relates to the field of electricity technologies, and in particular, to a speech recognition method and device.

BACKGROUND

Human beings exchange information with each other in a language, and the language includes two forms: speech and text. Transferring information by using speech is one of the most important basic functions of human beings. With the development of information technologies, a great amount of information also needs to be exchanged between human beings and machines. At present, computers have begun to simulate the process of information exchange between human beings.

The process of information exchange between human beings includes: 1. natural language generation: converting thought generated by the brain into a language; 2. speech synthesizing: converting the language into speech; 3. speech recognition: recognizing speech content that expresses the language; 4. natural language understanding: understanding language meanings expressed by the speech. The first two steps indicate a process executed by a speaker, and the last two steps indicate a process executed by a listener. The speech recognition is "recognizing speech content that expresses the language" during the foregoing process, and for a device, is recognizing speech spoken by human beings and converting the speech to text. The following describes the speech recognition from several aspects.

(1) Basic Principles of Speech Recognition by a Device:

Speech recognition is a mode recognition system, and the speech recognition includes the following steps:

1. language input;
2. preprocessing;
3. characteristics extracting, where characteristics are extracted and used as two branches for clustering training in 4 and for a recognizing operation in 5-7 respectively;
4. clustering training to obtain a template library;
5. executing similarity comparison by using a reference mode in the template library;
6. distortion detection on a result of step 5 during the recognizing process, and then 7 is performed; and
7. outputting a recognition result Preprocessing includes processing, such as sampling and filtering, on speech signals, and functions of the characteristic extracting is to extract, from the speech signals, several groups of parameters describing characteristics of the signals, for example, energy, formant, and cepstral coefficient, to perform training and recognition. A process of establishing a speech recognition system is as follows: First, perform training by using a great amount of speech to obtain a template library, then read a template of the template library, and compare the template with to-be-recognized speech, to obtain a recognition result.

The following describes nouns mentioned in this application file:

Training: Analyzing in advance speech characteristics parameters, making a speech template and storing the speech template in a speech parameter library, where the template may also be called a model, and there are mainly two types of models: an acoustic model (AM) and a language model (LM). The acoustic model is used to recognize "sound" from a sound signal, and the language model is used to convert the sound into "text";

Recognition: Obtaining a speech parameter by analyzing to-be-recognized speech in a way same as that for training, comparing the parameter with reference templates in the library one by one, finding, by using a determining method, a template closest to speech characteristics, and obtaining a recognition result, where the recognition result herein is in a form of text;

Distortion measures): A standard is required for comparison, and the standard is a "distortion measure" for measurement between speech characteristic parameter vectors, where the distortion measure is for comparison during a process of speech recognition, and there is a plurality of formulas for calculating the distortion measure, for example: calculating a distance between speech characteristic parameter vectors, more specifically, a distortion measure between a speech characteristic parameter vector $A(x1, y1)$ and a speech characteristic parameter vector $B(x2, y2)$ $D=\sqrt{(x1-x2)^2+(y1-y2)}$.

Main recognition framework: dynamic time warping (DTW, Dynamic Time Warping) based on model matching, and hidden Markov model (HMM, Hidden Markov Model) based on a statistical model.

(2) Models of Speech Recognition:

An acoustic model is used to recognize "sound" from a sound signal, and a language model is used to convert the sound into "text".

The most basic problem of speech recognition statistics is that an input signal or a characteristics sequence $O=\{O1, O2, \ldots, On\}$, and a word list $V=\{w1, w2, \ldots, wL\}$ are given, and M words are randomly selected from V to form a word sequence $W=(w1, w2, \ldots, wM)$, and a word sequence $W^*$ corresponding to the characteristics sequence O is calculated, so that:

$$W^* = \underset{W}{\mathrm{argmax}} P(W \mid O)$$

According to the Bayes formula, the foregoing formula may be written as:

$$W^* = \underset{W}{\mathrm{argmax}} \frac{P(O \mid W)P(W)}{P(O)}$$

where $P(O|W)$ is an acoustic model, and $P(W)$ is a language model. It can be seen from the foregoing that the two models are a basis of the automatic speech recognition (ASR) technology.

It can be seen from the foregoing that the acoustic model is a probability from a characteristics sequence to a word sequence, and a great amount of speech data and corresponding text data needs to be obtained for training, to obtain an acoustic model for each word. However, there are a great number of words in any language, which leads to a huge number of acoustic models of the words, and also causes an excessively large calculation volume and excessively long calculation time during a recognition process. To resolve the problem, people figure out that a word is formed by phones, and a phone is the smallest pronunciation unit, for example, an onset and a rime in Chinese, or a syllable in English. However, a data volume of phones is relatively small, for example, about 60 in English. The problem can be well resolved by establishing an acoustic model with a phone as a unit. Another advantage is that the number of phones is fixed, and an acoustic model does not need to be reestablished when content of a word list changes.

An acoustic model with a phone as a unit also needs to correspond to a pronunciation dictionary. In the dictionary, a pronunciation of each word in a word list is provided, and for Chinese, a pinyin annotation of each word is listed, for example, "中国 zh ong g uo".

A language model is a probability of a word sequence, and the probability can be decomposed into a product of probabilities that a plurality of two words or three words successively occurs.

Dual-word syntax: Occurrence of each word Wi is affected only by a word Wi−1 in front of the word Wi.

$$P(W) = \prod_{i=1}^{M} P(W_i | W_{i-1})$$

Three-word syntax: Occurrence of each word Wi is affected only by a word Wi−1 in front of the word Wi.

$$P(W) = \prod_{i=1}^{M} P(W_i | W_{i-2}, W_{i-1})$$

More syntax may be decomposed as required. Training of the acoustic model requires only text data, from which statistics about an occurrence probability of two words or multiple words are collected. It should be noted that, the text data needs to be sufficient to cover all words in a word list, and when content of the word list changes, the acoustic model needs to be updated frequently, to cover all the words in the word list.

In conclusion, for a speech recognition system, a phone set, a word list, and a pronunciation dictionary need to be input during model training, and a pronunciation dictionary, an acoustic model, and a language model need to be input during recognition.

(3) Factors Affecting a Recognition Rate of Speech Recognition

The recognition rate is defined as a percentage of input speech that is correctly recognized. The factors affecting a recognition rate include the following aspects:

1. a Size of a Word List

Accuracy of recognizing one word from 10 words is far greater than that of recognizing one word from 1000 words. A larger word list means more choices and more similar acoustic and linguistics content, that is, acoustic confusability and linguistic confusability are higher. Therefore, a speech recognition rate of a large word list is relatively low, and it is difficult to improve the recognition rate.

acoustic confusability:
Chang ting 长亭
Cheng qing 澄清
linguistic confusability:
Shang/hai nan Go to Hainan
Shang hai/nan men South gate of Shanghai 2. Speech Recognition for a Specific Field In a specific field, syntax rules of a language are relatively fixed, and therefore linguistic confusability is relatively low, and a recognition difficulty is relatively low.

3. Noise

In one aspect, noise reduces intelligibility of speech; in another aspect, pronunciation of people changes greatly in a noisy environment, for example, a higher voice, a slower speaking speed, a higher pitch, and the like.

4. Training Data Volume

Sufficient data needs to be provided for training in each state, and a larger word list requires a larger data volume. For a state in which data is insufficient, some states are aggregated by using a tie method by a training program and trained by using same data; therefore, a recognition rate of a system is affected to some extent.

(4) Speech Command System

A speech command system is a set of devices or a system that recognizes a speech command and obtains text, and executes, according to the text, an action specified by the command, to meet a user's requirement. The speech command indicates that a user uses speech as a control interface, for example, a user inputs speech "turn on the radio" to control turning-on of a radio. Speech command recognition converts a speech command into text, and belongs to one type of speech recognition.

If a user expects that the system can recognize a specific speech command set, the user needs to provide a command word list, and also provide a corresponding pronunciation dictionary. The system uses the command word list as a word list and obtains, by training, a language model corresponding to the command word list. An acoustic model uses a phone as a unit, training of the acoustic model is irrelevant to the user, and only a speech library is required for training. A device reads a pronunciation dictionary, an acoustic model, and a language model; then, the device receives a speech command input by a user, executes speech recognition, and executes a corresponding operation according to a recognition result.

In the foregoing solutions, the user needs to preset a speech command list and a pronunciation dictionary. A new language model is obtained by training based on the speech command list and a language model. After a training process is complete, a recognizable speech command list, pronunciation dictionary, and language model is fixed. After entering a recognition process, the speech command list, the pronunciation dictionary, and the language model will not change. If the command word list needs to be changed, the recognition process needs to be suspended, and the training process is restarted. Therefore, generally, a large speech command word list and a large pronunciation dictionary are provided and used to train the language model.

SUMMARY

Embodiments of the present invention provide a speech recognition method and device, which are used to update online a pronunciation dictionary and a speech model, to ensure a high recognition rate of a command word, improve a recognition speed of a system, and reduce response time and a size of a model file.

A first aspect of the embodiments of the present invention provides a speech recognition method, including:

acquiring a text file specified by a user, and extracting a command word from the text file according to a predetermined rule, to obtain a command word list;

comparing the command word list with a command word library, to confirm whether the command word list includes a new command word, where the new command word is a command word that is included in the command word list but not included in the command word library;

if the command word list includes the new command word, generating a corresponding new pronunciation dictionary according to the new command word and performing training to obtain a new language model;

merging the new language model into a language model library corresponding to the command word library; and receiving speech, and performing speech recognition on the speech according to an acoustic model, a phonation dictionary, and the language model library that are corresponding to the command word library.

With reference to an implementation manner of the first aspect, in a first possible implementation manner, the acquiring a text file specified by a user includes: acquiring a text file from a specified address input by the user, or acquiring a text file input by the user.

With reference to the implementation manner of the first aspect, in a second possible implementation manner, the extracting a command word from the text file according to a predetermined rule, to obtain a command word list includes:

reading content of the text file, performing word segmentation on the content, and then selecting the command word from a word segmentation result according to the predetermined rule, to obtain the command word list.

With reference to the implementation manner of the first aspect, the first possible implementation manner, or the second possible implementation manner, in a third possible implementation manner, the method further includes:

obtaining a speech recognition result by means of the speech recognition, and determining whether the speech recognition result is a preset flag command word;

if the speech recognition result is a preset flag command word, acquiring a text file corresponding to the preset flag command word; if the speech recognition result is not a preset flag command word, executing an operation corresponding to the speech recognition result.

With reference to the implementation manner of the first aspect, the first possible implementation manner, or the second possible implementation manner, in a fourth possible implementation manner, after the speech recognition is complete, the method further includes:

determining whether the text file specified by the user changes; if the text file specified by the user changes, acquiring a changed text file; if the text file does not change, executing an operation corresponding to a speech recognition result.

A second aspect of the embodiments of the present invention provides a speech recognition method, including:

receiving speech, and performing speech recognition on the speech according to an acoustic model, a phonation dictionary, and a language model library that are corresponding to a command word library, to obtain a speech recognition result;

if the speech recognition result is a preset flag command word, acquiring a text file corresponding to the preset flag command word; if the speech recognition result is not a preset flag command word, executing an operation corresponding to the speech recognition result;

extracting, according to a predetermined rule, a command word from the text file corresponding to the preset flag command word, to obtain a command word list;

comparing the command word list with the command word library, to confirm whether the command word list includes a new command word, where the new command word is a command word that is included in the command word list but not included in the command word library; and if the command word list includes the new command word, generating a corresponding new pronunciation dictionary according to the new command word and performing training to obtain a new language model; and merging the new language model into the language model library corresponding to the command word library.

With reference to an implementation manner of the second aspect, in a first possible implementation manner, the acquiring a text file corresponding to the preset flag command word includes: acquiring a text file from an address corresponding to the preset flag command word, or acquiring a text file that is corresponding to the preset flag command word and input by a user.

A third aspect of the embodiments of the present invention provides a speech recognition device, including:

a text acquiring unit, configured to acquire a text file specified by a user;

a list generating unit, configured to: extract, according to a predetermined rule, a command word from the text file acquired by the text acquiring unit, to obtain a command word list;

a determining unit, configured to compare the command word list obtained by the list generating unit with a command word library, to confirm whether the command word list includes a new command word, where the new command word is a command word that is included in the command word list but not included in the command word library;

a training and generating unit, configured to: if a determining result of the determining unit is that the command word list includes a new command word, generate a corresponding new pronunciation dictionary according to the new command word and perform training to obtain a new language model; and merge the new language model into a language model library corresponding to the command word library;

a speech receiving unit, configured to receive speech; and a recognizing unit, configured to perform, according to an acoustic model, a phonation dictionary, and the language model library that are corresponding to the command word library, speech recognition on the speech received by the speech receiving unit.

With reference to an implementation manner of the third aspect, in a first possible implementation manner, that the text acquiring unit is specifically configured to: acquire a text file from a specified address input by the user, or acquire a text file input by the user.

With reference to the implementation manner of the third aspect, in a second possible implementation manner, the list generating unit is specifically configured to read content of the text file, perform word segmentation on the content, and then select the command word from a word segmentation result according to the predetermined rule, to obtain the command word list.

With reference to the implementation manner of the third aspect, the first possible implementation manner, or the second possible implementation manner, in a third possible implementation manner, the determining unit is further configured to: after the recognizing unit completes the speech recognition, determine whether a speech recognition result is a preset flag command word;

the text acquiring unit is further configured to: if the determining unit determines that the speech recognition result is a preset flag command word, acquire a text file corresponding to the preset flag command word; and an executing unit is configured to: if the determining unit determines that the speech recognition result is not a preset flag command word, execute an operation corresponding to the speech recognition result.

With reference to the implementation manner of the third aspect, the first possible implementation manner, or the second possible implementation manner, in a fourth possible implementation manner, the determining unit is further configured to: after the speech recognition is complete, determine whether the text file specified by the user changes;

the text acquiring unit is further configured to: if the determining unit determines that the text file specified by the user changes, acquire a changed text file; and an executing unit is configured to: if the determining unit determines that the text file specified by the user does not change, execute an operation corresponding to the speech recognition result.

A fourth aspect of the embodiments of the present invention provides a speech recognition device, including:

a speech receiving unit, configured to receive speech;

a recognizing unit, configured to perform, according to an acoustic model, a phonation dictionary, and a language model library that are corresponding to a command word library, speech recognition on the speech received by the speech receiving unit, to obtain a speech recognition result;

a determining unit, configured to determine whether the speech recognition result obtained by the recognizing unit is a preset flag command word;

a text acquiring unit, configured to: if the determining unit determines that the speech recognition result is a preset flag command word, acquire a text file corresponding to the preset flag command word;

an executing unit, configured to: if the determining unit determines that the speech recognition result is not a preset flag command word, execute an operation corresponding to the speech recognition result;

a list generating unit, configured to: extract, according to a predetermined rule, a command word from the text file corresponding to the preset flag command word, to obtain a command word list, where the determining unit is further configured to compare the command word list obtained by the list generating unit with the command word library, to confirm whether the command word list includes a new command word, where the new command word is a command word that is included in the command word list but not included in the command word library; and a training and generating unit, configured to: if the determining unit determines that the command word list includes a new command word, generate a corresponding new pronunciation dictionary according to the new command word and perform training to obtain a new language model; and merge the new language model into the language model library corresponding to the command word library.

With reference to an implementation manner of the fourth aspect, in a first possible implementation manner, the text acquiring unit is specifically configured to: if the determining unit determines that the speech recognition result is a preset flag command word, acquire a text file from an address corresponding to the preset flag command word, or acquire a text file that is corresponding to the preset flag command word and input by a user.

As can be seen from the foregoing technical solutions, the embodiments of the present invention have the following advantages: A user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that expression forms "first" and "second" are used in the embodiments of the present invention, for example, a first command word list and a second command word list, where the "first" and "second" are merely used to differentiate two command word lists and shall not be construed as other specific limitation meanings, which is not repeatedly described in subsequent embodiments.

A speech recognition method and system are widely applied to various devices, for example, mobile phones and computers. In the embodiments of the present invention, devices specifically using the solutions in the embodiments of the present invention are not limited.

Figure 1A:
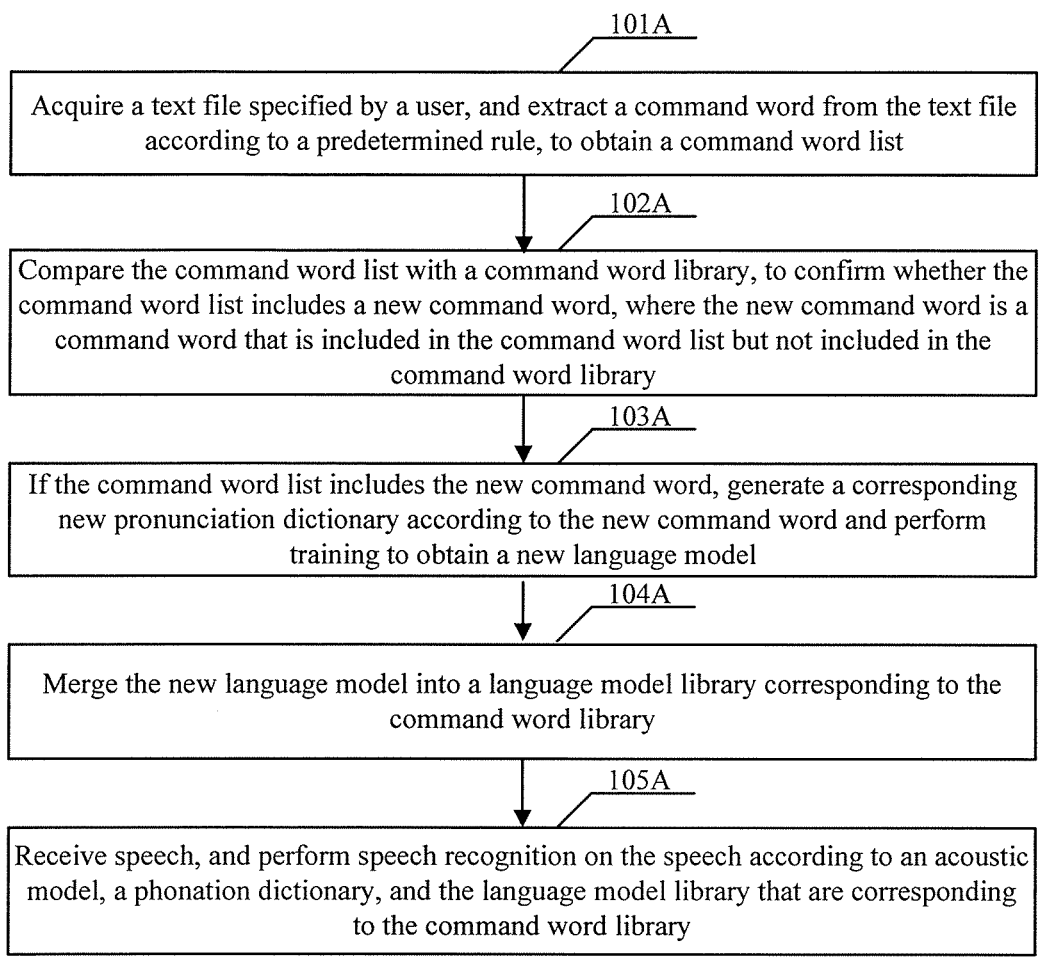
FIG. 1A is a schematic flowchart of a speech recognition method according to an embodiment of the present invention.

An embodiment of the present invention provides a speech recognition method. As shown in FIG. 1A, the method includes:

101A: Acquire a text file specified by a user, and extract a command word from the text file according to a predetermined rule, to obtain a command word list.

Optionally, the acquiring a text file specified by a user includes: acquiring a text file from a designated address input by the user, or acquiring a text file input by the user.

The text file specified by the user may be: any text file, a storage path of a text file, or a link of a text file, for example, a web page, a web link, a web page storage link, a Word (which is a word processor application) document, a txt (which is a text format) document, a Word document storage path, a txt document storage path, a Word document link, a txt document link, a text document in another format, a storage path or link of a text document in another format, or the like is provided. Specific representation forms of the text file specified by the user are not limited in this embodiment of the present invention.

The predetermined rule may be any preset command word generating rule, for example, all nouns in a word segmentation result may be used as command words, or all verbs in a word segmentation result may be used as command words, or all nouns and verbs are used as command words, or all words in a text are used as command words. A specific predetermined rule is not limited in this embodiment of the present invention.

102A: Compare the command word list with a command word library, to confirm whether the command word list includes a new command word, where the new command word is a command word that is included in the command word list but not included in the command word library.

103A: If the command word list includes the new command word, generate a corresponding new pronunciation dictionary according to the new command word and perform training to obtain a new language model.

104A: Merge the new language model into a language model library corresponding to the command word library.

105A: Receive speech, and perform speech recognition on the speech according to an acoustic model, a phonation dictionary, and the language model library that are corresponding to the command word library.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Further, the online updating manner in the foregoing solution may be that: after the speech recognition is complete, the foregoing further includes: obtaining a speech recognition result by means of the speech recognition, determining whether the speech recognition result is a preset flag command word; if the speech recognition result is a preset flag command word, acquiring a text file corresponding to the preset flag command word; if the speech recognition result is not a preset flag command word, executing an operation corresponding to the speech recognition result. The preset flag command word belongs to a flag command word in the command word library, and a correspondence between a preset flag command word and a text file is stored in a speech recognition device. The online updating manner may also be: after the speech recognition is complete, determining whether the text file specified by the user changes; if the text file specified by the user changes, acquiring a changed text file; if the text file does not change, executing an operation corresponding to the speech recognition result.

Figure 1B:
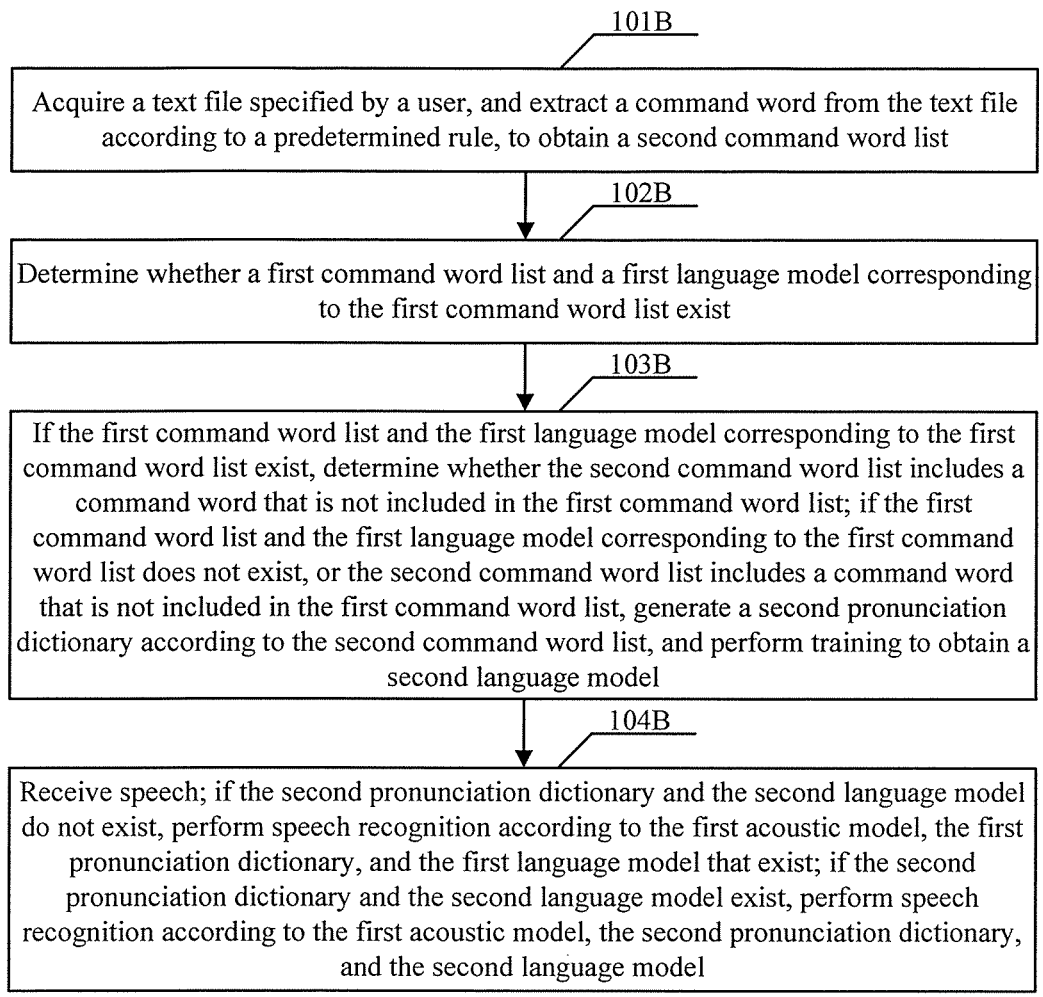
FIG. 1B is a schematic flowchart of another speech recognition method according to an embodiment of the present invention.

An embodiment of the present invention further provides another speech recognition method. As shown in FIG. 1B, the method includes:

101B: Acquire a text file specified by a user, and extract a command word from the text file according to a predetermined rule, to obtain a second command word list.

Optionally, the extracting a command word from the text file according to a predetermined rule, to obtain a second command word list includes: reading content of the text file, performing word segmentation on the content, and then selecting the command word from a word segmentation result according to the predetermined rule, to obtain the second command word list.

102B: Determine whether a first command word list and a first language model corresponding to the first command word list exist.

103B: If the first command word list and the first language model corresponding to the first command word list exist, determine whether the second command word list includes a command word that is not included in the first command word list; if the first command word list and the first language model corresponding to the first command word list does not exist, or the second command word list includes a command word that is not included in the first command word list, generate a second pronunciation dictionary according to the second command word list, and perform training to obtain a second language model.

In step 103B, the second pronunciation dictionary is directly generated according to the second command word list and training is performed to obtain the second language model. An operation of generating a pronunciation dictionary and performing training needs to be performed on all command words in the second command word list, and many processing resources are occupied. Therefore, this embodiment of the present invention further provides an exemplary solution, in which an operation of generating a pronunciation dictionary and performing training needs to be performed merely on newly added command words. Exemplarily, the generating a second pronunciation dictionary according to the second command word list, and performing training to obtain a second language model includes: generating a command word that is included in the second command word list but not included in the first command word list, performing training to obtain a speech dictionary and a language model, adding the speech dictionary and the language model to a first pronunciation dictionary and the first language model, respectively, to obtain the second pronunciation dictionary and the second language model.

104B: Receive speech; if the second pronunciation dictionary and the second language model do not exist, perform speech recognition according to the first acoustic model, the first pronunciation dictionary, and the first language model that exist; if the second pronunciation dictionary and the second language model exist, perform speech recognition according to the first acoustic model, the second pronunciation dictionary, and the second language model.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Further, the online updating manner in the foregoing solution may be that: after the speech recognition is complete, the method further includes:

determining whether a speech recognition result is a preset flag command word, and if the speech recognition result is a preset flag command word, acquiring a text file corresponding to the preset flag command word; if the speech recognition result is not a preset flag command word, executing an operation corresponding to the speech recognition result; or determining whether the text file changes, and if the text file changes, acquiring a changed text file; if the text file does not change, executing an operation corresponding to the speech recognition result.

Figure 2A:
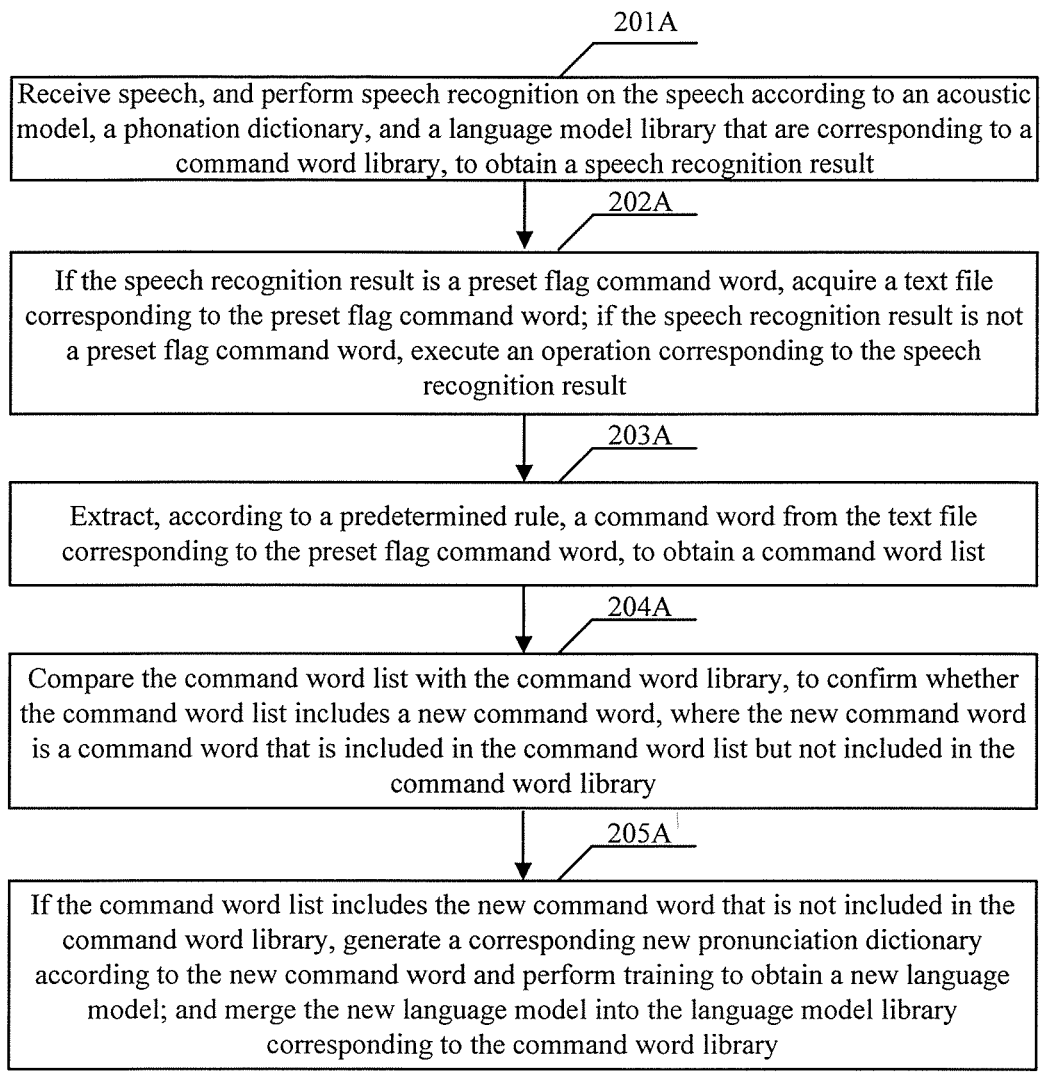
FIG. 2A is a schematic flowchart of another speech recognition method according to an embodiment of the present invention.

An embodiment of the present invention further provides another speech recognition method. As shown in FIG. 2A, the method includes:

201A: Receive speech, and perform speech recognition on the speech according to an acoustic model, a phonation dictionary, and a language model library that are corresponding to a command word library, to obtain a speech recognition result.

202A: If the speech recognition result is a preset flag command word, acquire a text file corresponding to the preset flag command word; if the speech recognition result is not a preset flag command word, execute an operation corresponding to the speech recognition result.

Optionally, the acquiring a text file corresponding to the preset flag command word includes: acquiring a text file from an address corresponding to the preset flag command word, or acquiring a text file that is corresponding to the preset flag command word and input by a user.

203A: Extract, according to a predetermined rule, a command word from the text file corresponding to the preset flag command word, to obtain a command word list.

204A: Compare the command word list with the command word library, to confirm whether the command word list includes a new command word, where the new command word is a command word that is included in the command word list but not included in the command word library.

205A: If the command word list includes the new command word that is not included in the command word library, generate a corresponding new pronunciation dictionary according to the new command word and perform training to obtain a new language model; and merge the new language model into the language model library corresponding to the command word library.

After the foregoing step 205A is executed, preparation is made for next speech recognition, and the following may be executed again: receiving speech, and performing speech recognition on the speech according to an acoustic model, a phonation dictionary, and a language model library that are corresponding to a command word library.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Figure 2B:
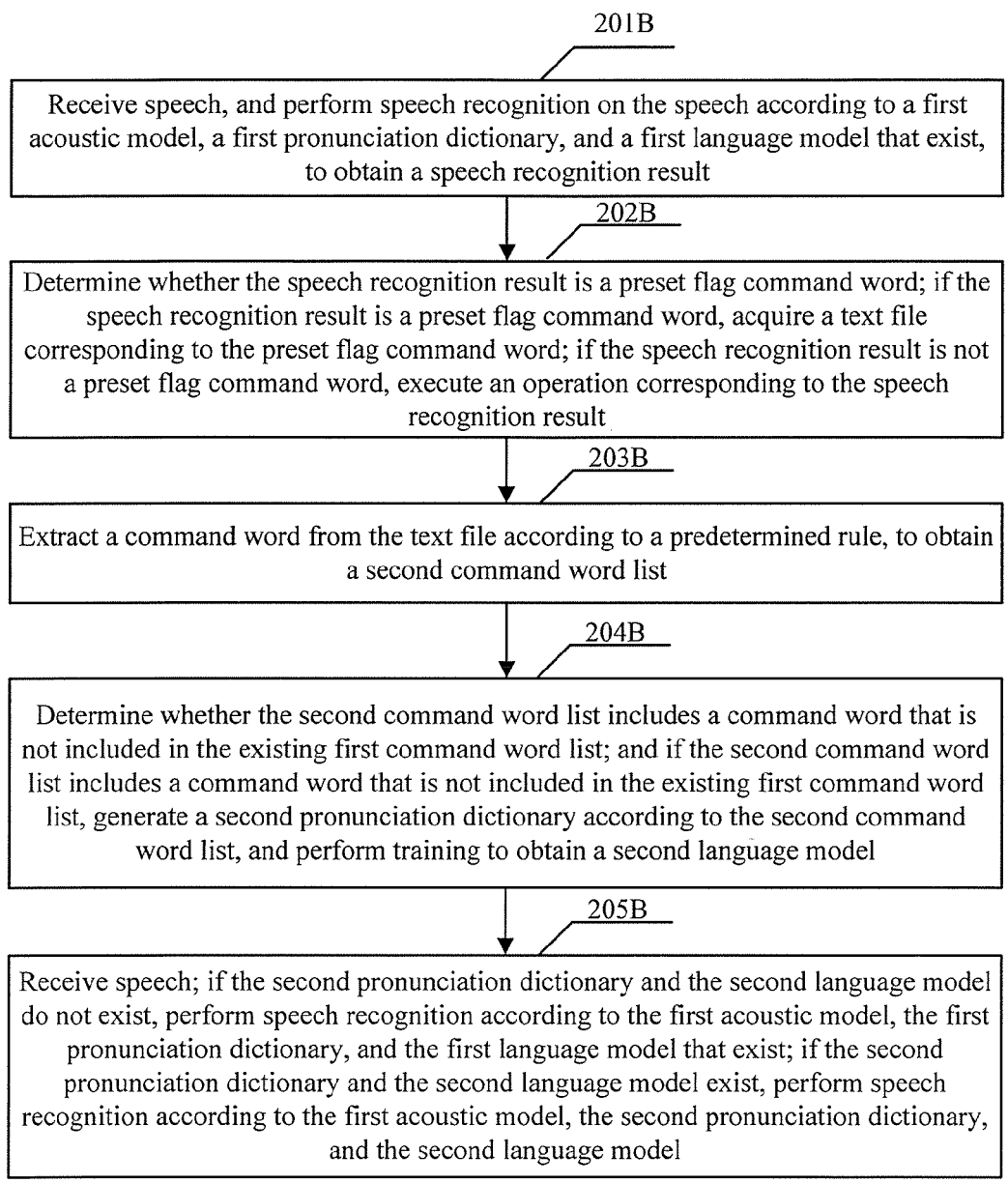
FIG. 2B is a schematic flowchart of another speech recognition method according to an embodiment of the present invention.

An embodiment of the present invention further provides another speech recognition method. As shown in FIG. 2B, the method includes:

201B: Receive speech, and perform speech recognition on the speech according to a first acoustic model, a first pronunciation dictionary, and a first language model that exist, to obtain a speech recognition result.

202B: Determine whether the speech recognition result is a preset flag command word; if the speech recognition result is a preset flag command word, acquire a text file corresponding to the preset flag command word; if the speech recognition result is not a preset flag command word, execute an operation corresponding to the speech recognition result.

Optionally, the acquiring a text file corresponding to the preset flag command word includes: acquiring a text file from an address corresponding to the preset flag command word, or acquiring a text file that is corresponding to the preset flag command word and input by a user.

203B: Extract a command word from the text file according to a predetermined rule, to obtain a second command word list.

204B: Determine whether the second command word list includes a command word that is not included in the existing first command word list; if the second command word list includes a command word that is not included in the existing first command word list, generate a second pronunciation dictionary according to the second command word list, and perform training to obtain a second language model.

205B: Receive speech; if the second pronunciation dictionary and the second language model do not exist, perform speech recognition according to the first acoustic model, the first pronunciation dictionary, and the first language model that exist; if the second pronunciation dictionary and the second language model exist, perform speech recognition according to the first acoustic model, the second pronunciation dictionary, and the second language model.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Figure 3:
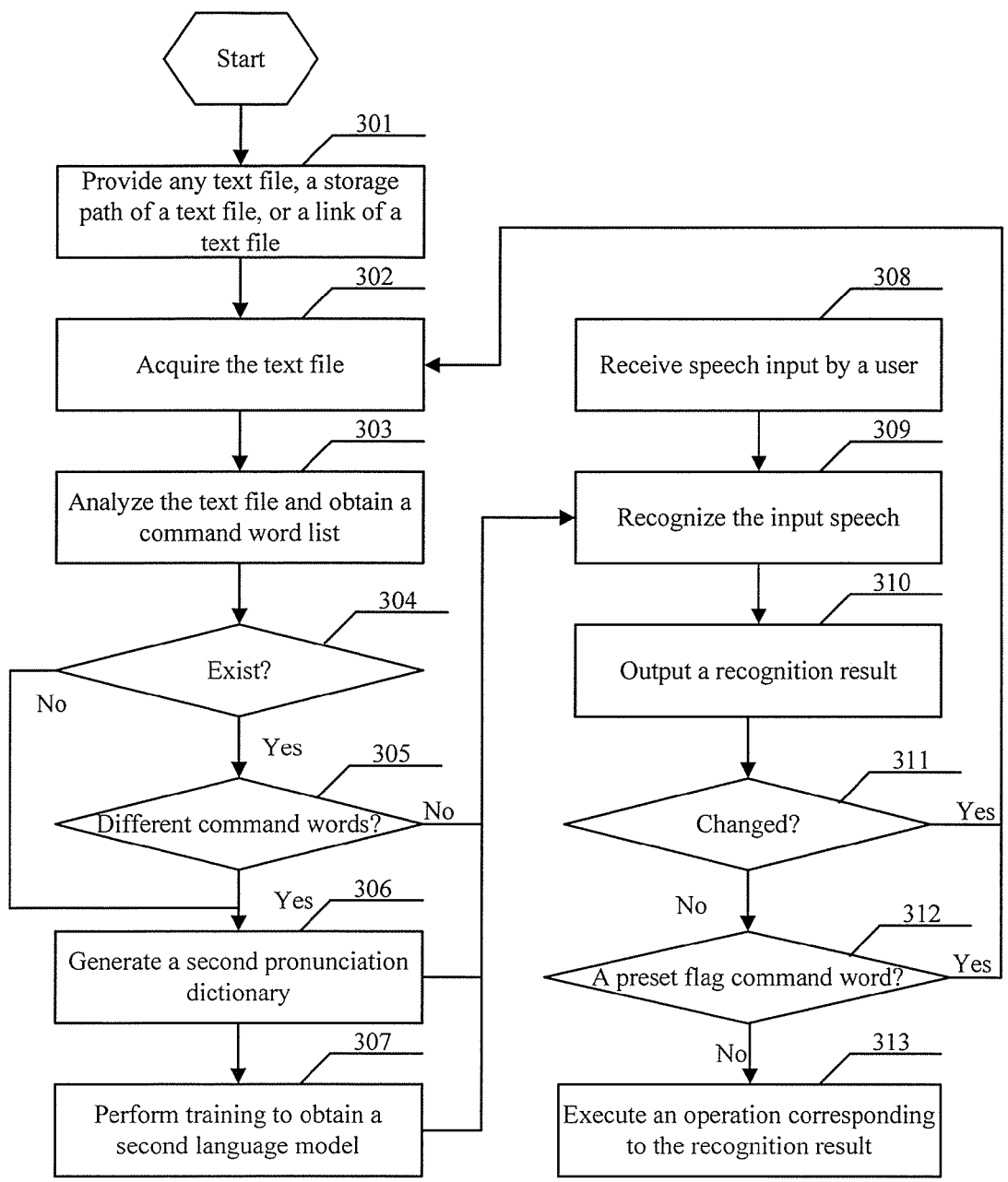
FIG. 3 is a schematic flowchart of another speech recognition method according to an embodiment of the present invention.
Figure 4:
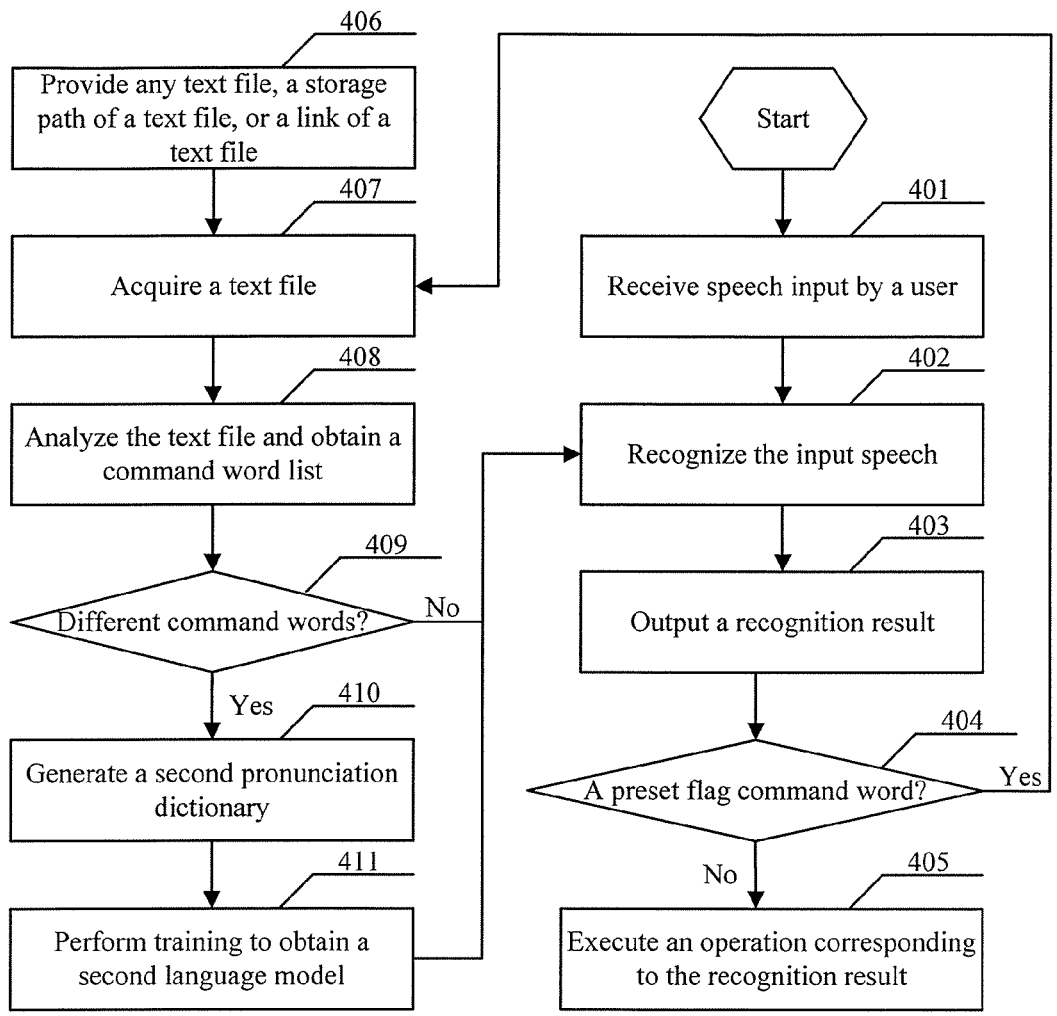
FIG. 4 is a schematic flowchart of another speech recognition method according to an embodiment of the present invention.

To describe the foregoing two embodiments in more details, examples of the two embodiments are provided in embodiments of the present invention, as shown in FIG. 3 and FIG. 4. Start positions of procedures are also marked in schematic diagrams of FIG. 3 and FIG. 4. In the following two embodiments, "first" is used to indicate an acoustic model, a pronunciation dictionary, and a language model that exist, and "second" is used to indicate a pronunciation dictionary and a language model that are generated by a device.

Corresponding to the embodiments of FIG. 1, as shown in FIG. 3, a procedure includes:

301: A user provides any text file, a storage path of a text file, or a link of a text file, for example, provides a web page, a web link, a web page storage link, a Word document, a txt document, a Word document storage path, a txt document storage path, a Word document link, a txt document link, a text document in another format, a storage path or link of a text document in another format, or the like.

302: A device acquires the text file.

303: The device analyzes the text file and obtains a second command word list according to the text file.

The analyzing process includes: reading content of the text file and performing word segmentation on the content of the text file. A manner of obtaining a command word list may be: selecting, from a word segmentation result, all words or some words as command words, and generating the second command word list. For example: all nouns of the word segmentation result may be used as command words, or all verbs of the word segmentation result may be used as command words, or all nouns and verbs are used as command words, or all words in the text are used as command words, of which a specific manner is not limited.

304: The device determines whether a first command word list and a first language model of the first command word list exist. All command words of the first command word list are included in the first language model. If the first command word list and the first language model of the first command word list exist, step 305 is executed; if the first command word list and the first language model of the first command word list do not exist, step 306 is executed.

305: Compare the obtained second command word list with the first command word list, and determine whether there are different command words; if a determining result is that there is no different command word, the device may read a first acoustic model, a first pronunciation dictionary, and the first language model that exist, and execute step 309; if the determining result is that there are different command words, execute step 306.

306: The device generates a corresponding second pronunciation dictionary by using the second command word list, where a generating method may be performed by using a text-speech conversion algorithm.

A dictionary is a text file and content of the dictionary may be as follows:
回复　h ui f u
转发　zh uan f a

307: The device generates a training text by using the second command word list and performs training to obtain a second language model, which may be implemented by converting the command words into a required form according to a requirement of a language model training text.

An example of content of the training text may be as follows:
<s> respond </s>
<s> forward </s>

The system reads the first acoustic model, the second pronunciation dictionary, and the second language model, and executes step 309.

308: The device receives speech input by the user.

309: The device performs recognition on the input speech. It should be noted that the acoustic model, the pronunciation dictionary, and the language model that are used in this step may be, according to the foregoing steps, the first acoustic model, the first pronunciation dictionary, and the first language model; or the first acoustic model, the second pronunciation dictionary, and the second language model.

310: The device outputs a recognition result.

311: The device determines whether the text file changes; if the text file changes, executes step 302, and then executes a subsequent procedure of step 302; if the text file does not change, executes step 312.

That the text file changes may be that: the text file provided by the user changes, or a link changes, content to which a link directs changes, or the like.

312: Determine whether the recognition result is a preset flag command word, if the recognition result is a preset flag command word, execute step 302, and then execute a subsequent procedure of step 302; if the recognition result is not a preset flag command word, execute step 313.

The preset flag command word may be: "open hot news" or the like, for example:

During execution of step 302, a text file may be acquired according to a correspondence between a preset flag command word and a text file or a link, for example:
 open hot news a corresponding text file hot news.txt
 open international news a corresponding text file international news.txt
 open Google a link of a corresponding text file www.google.com

313: Execute an operation corresponding to the recognition result.

Corresponding to the embodiments of FIG. 2, as shown in FIG. 4, a procedure includes:

401: A device receives speech input by a user.

402: The device performs recognition on the input speech. It should be noted that an acoustic model, a pronunciation dictionary, and a language model, which are used when this step is executed for the first time or speech recognition is executed when it proceeds from step 409 to step 402, are a first acoustic model, a first pronunciation dictionary, and a first language model. If speech recognition is executed when it proceeds from step 411 to step 402, the first acoustic model, a second pronunciation dictionary, and a second language model are used.

A first command word list, the first sound production library, and the first language model exist, and the system reads such information. For example, the first command word list is:
 speech recognition
 power on
 exit
 Lau Tak Wah
 Hok Yau Cheung
 open international news
 open hot news
 open Google A correspondence exists between a preset flag command word in the first command word list and a text file or a link of a text file in step 406, for example:

open hot news a corresponding file hot news.txt open international news a corresponding file international news.txt open Google a corresponding link www.google.com

403: The device outputs a recognition result.

404: Determine whether the recognition result is a preset flag command word; if the recognition result is a preset flag command word, execute step 407, and then execute a subsequent procedure of 407; if the recognition result is not a preset flag command word, execute 405.

405: Execute an operation corresponding to the recognition result.

406: The user provides any text file, a storage path of a text file, or a link of a text file, for example, provides a web page, a web link, a web page storage link, a Word document, a txt document, a Word document storage path, a txt document storage path, a Word document link, a txt document link, a text document in another format, a storage path or link of a text document in another format, or the like.

407: Read a text file specified by the preset flag command word.

The specified text file may be: any text file, a storage path of a text file, or a link of a text file, for example, a web page, a web link, a web page storage link, a Word (which is a word processor application) document, a txt (which is a text format) document, a Word document storage path, a txt document storage path, a Word document link, a txt document link, a text document in another format, a storage path or link of a text document in another format, or the like is provided. Specific representation forms of the specified text file are not limited in this embodiment of the present invention.

408: The device analyzes the text file and obtains a second command word list according to the text file.

The analyzing process includes: reading content of the text file and performing word segmentation on the content of the text file. A manner of obtaining a command word list may be: selecting, from a word segmentation result, all words or some words as command words, and generating the second command word list. For example: all nouns of the word segmentation result may be used as command words, or all verbs of the word segmentation result may be used as command words, or all nouns and verbs are used as command words, or all words in the text are used as command words, of which a specific manner is not limited.

409: Compare the obtained second command word list with the first command word list and determine whether there are different command words; if a determining result is that there is no different command word, the device may read the first acoustic model, the first pronunciation dictionary, and the first language model that exist, and execute step 402; if the determining result is that there are different command words, execute step 410.

410: The device generates a corresponding second pronunciation dictionary by using the second command word list, where a generating method may be performed by using a text-speech conversion algorithm.

A dictionary is a text file, and content of the dictionary may be as follows:

回复 h ui f u

转发 zh uan f a

411: The device generates a training text by using the second command word list and performs training to obtain a second language model, which may be implemented by converting the command words into a required form according to a requirement of a language model training text.

An example of content of the training text may be as follows:

<s> respond </s>

<s> forward </s>

The system reads the first acoustic model, the second pronunciation dictionary, and the second language model, and executes step 402.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Figure 5:
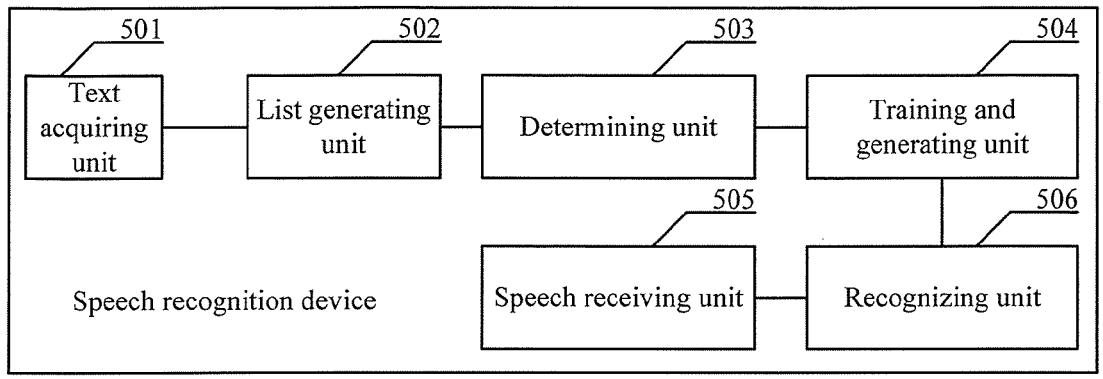
FIG. 5 is a schematic structural diagram of a speech recognition device according to an embodiment of the present invention.

An embodiment of the present invention further provides a speech recognition device. As shown in FIG. 5, the device includes:

a text acquiring unit 501, configured to acquire a text file specified by a user.

a list generating unit 502, configured to: extract, according to a predetermined rule, a command word from the text file acquired by the text acquiring unit 501, to obtain a command word list;

a determining unit 503, configured to compare the command word list obtained by the list generating unit 502 with a command word library, to confirm whether the command word list includes a new command word, where the new command word is a command word that is included in the command word list but not included in the command word library;

a training and generating unit 504, configured to: if a determining result of the determining unit 503 is that the command word list includes a new command word that is not included in the command word library, generate a corresponding new pronunciation dictionary according to the new command word and perform training to obtain a new language model; and merge the new language model into a language model library corresponding to the command word library;

a speech receiving unit 505, configured to receive speech; and a recognizing unit 506, configured to perform, according to an acoustic model, a phonation dictionary, and the language model library that are corresponding to the command word library, speech recognition on the speech received by the speech receiving unit 505.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Optionally, that the text acquiring unit 501 is specifically configured to: acquire a text file from a specified address input by the user, or acquire a text file input by the user.

Optionally, the list generating unit 502 is specifically configured to read content of the text file, perform word segmentation on the content, and then select the command word from a word segmentation result according to the predetermined rule, to obtain the command word list.

Figure 6:
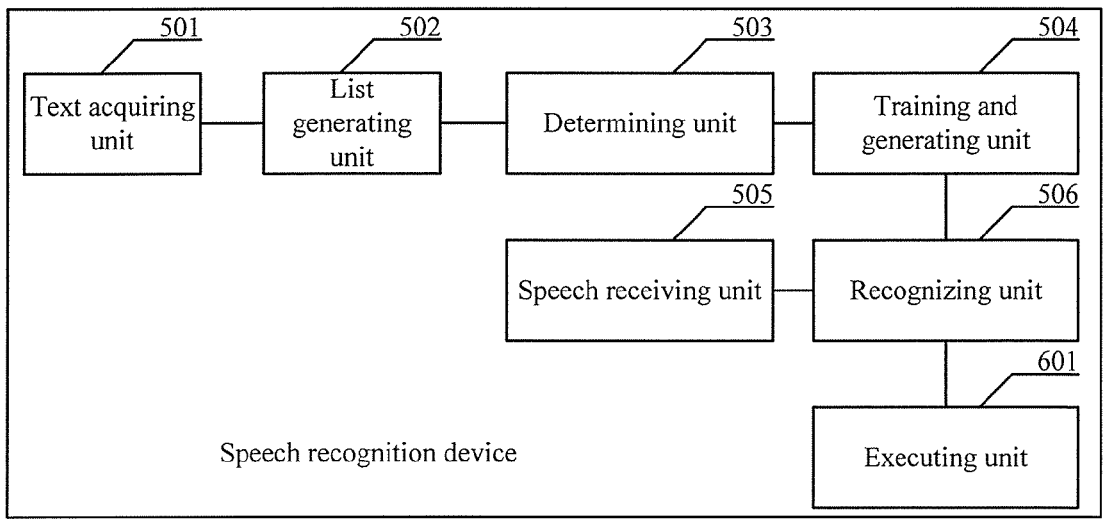
FIG. 6 is a schematic structural diagram of another speech recognition device according to an embodiment of the present invention.

Further, this embodiment of the present invention further provides an implementation manner of online updating a text file, as shown in FIG. 6.

The determining unit 503 is further configured to: after the speech recognition is complete, determine whether a speech recognition result is a preset flag command word.

The text acquiring unit 501 is further configured to: if the determining unit 503 determines that the speech recognition result is a preset flag command word, acquire a text file corresponding to the preset flag command word.

An executing unit 601 is configured to: if the determining unit 503 determines that the speech recognition result is not a preset flag command word, execute an operation corresponding to the speech recognition result.

Alternatively, the determining unit 503 is further configured to: after the speech recognition is complete, determine whether the text file specified by the user changes.

The text acquiring unit 501 is further configured to: if the determining unit 503 determines that the text file specified by the user changes, acquire a changed text file.

The executing unit 601 is configured to: if the determining unit 503 determines that the text file specified by the user does not change, execute an operation corresponding to the speech recognition result.

Optionally, the training and generating unit 504 is specifically configured to generate a command word that is included in a second command word list but not included in a first command word list, perform training to obtain a speech dictionary and a language model, add the speech dictionary and the language model to a first pronunciation dictionary and a first language model, respectively, to obtain a second pronunciation dictionary and a second language model.

Figure 7:
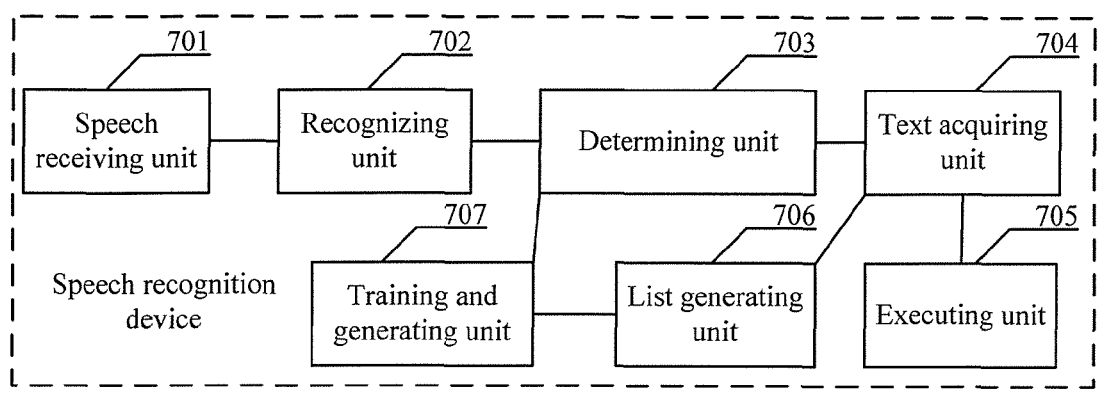
FIG. 7 is a schematic structural diagram of another speech recognition device according to an embodiment of the present invention.

An embodiment of the present invention further provides another speech recognition device. As shown in FIG. 7, the device includes:

a speech receiving unit 701, configured to receive speech;

a recognizing unit 702, configured to perform, according to an acoustic model, a phonation dictionary, and a language model library that are corresponding to a command word library, speech recognition on the speech received by the speech receiving unit 701, to obtain a speech recognition result;

a determining unit 703, configured to determine whether the speech recognition result obtained by the recognizing unit 702 is a preset flag command word;

a text acquiring unit 704, configured to: if the determining unit 703 determines that the speech recognition result is a preset flag command word, acquire a text file corresponding to the preset flag command word;

an executing unit 705, configured to: if the determining unit 703 determines that the speech recognition result is not a preset flag command word, execute an operation corresponding to the speech recognition result;

a list generating unit 706, configured to: extract, according to a predetermined rule, a command word from the text file corresponding to the preset flag command word, to obtain a command word list, where the determining unit 703 is further configured to compare the command word list obtained by the list generating unit 706 with the command word library, to confirm whether the command word list includes a new command word, where the new command word is a command word that is included in the command word list but not included in the command word library; and a training and generating unit 707, configured to: if the determining unit 703 determines that the command word list includes a command word that is not included in the command word library, generate a corresponding new pronunciation dictionary according to the new command word and perform training to obtain a new language model; and merge the new language model into the language model library corresponding to the command word library.

In the solution according to this embodiment of the present invention, a user updates a command word list by detecting a change of a command word, with no need to define the command word list and a pronunciation dictionary in advance; in addition, the pronunciation dictionary and a language model can be updated online during a recognition process, and do not need to be updated offline. Command words acquired online are closely related to online content; therefore, the number of the command words is limited and far less than the number of frequently used words, for example, far less than frequently used Chinese words (about 50000 words), which can ensure a high recognition rate of a command word, a high recognition speed of a system, short response time, and a relatively small size of a model file.

Optionally, the text acquiring unit 704 is specifically configured to: if the determining unit 703 determines that the speech recognition result is a preset flag command word, acquire a text file from an address corresponding to the preset flag command word, or acquire a text file that is corresponding to the preset flag command word and input by a user.

Figure 8:
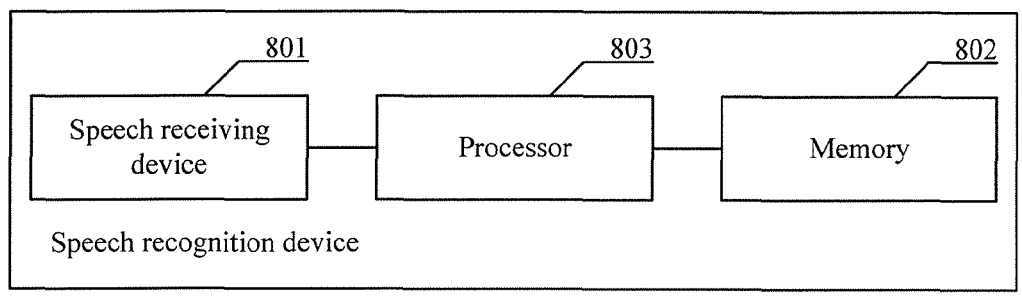
FIG. 8 is a schematic structural diagram of another speech recognition device according to an embodiment of the present invention.

An embodiment of the present invention further provides a speech recognition device. As shown in FIG. 8, the device includes:

a speech receiving device 801, configured to receive speech;

a memory 802, configured to store a command word library, an acoustic model, a phonation dictionary, and a language model library; and a processor 803, configured to acquire a text file specified by a user, and extract a command word from the text file according to a predetermined rule, to obtain a command word list; compare the command word list with the command word library, to confirm whether the command word list includes a new command word, where the new command word is a command word that is included in the command word list but not included in the command word library; if the command word list includes the new command word, generate a corresponding new pronunciation dictionary according to the new command word and perform training to obtain a new language model; merge the new language model into the language model library corresponding to the command word library; and perform, according to the acoustic model, the phonation dictionary, and the language model library that are corresponding to the command word library, speech recognition on the speech received by the speech receiving device 801.

Optionally, that the processor 803 is configured to extract a command word from the text file according to a predetermined rule, to obtain a command word list includes that: the processor 803 is configured to read content of the text file, perform word segmentation on the content, and then select the command word from a word segmentation result according to the predetermined rule, to obtain the second command word list.

Further, the processor 803 is further configured to determine whether a speech recognition result is a preset flag command word; if the speech recognition result is a preset flag command word, acquire a text file corresponding to the preset flag command word; if the speech recognition result is not a preset flag command word, execute an operation corresponding to the speech recognition result; or determine whether the text file changes, if the text file changes, acquire a changed text file; if the text file does not change, execute an operation corresponding to the speech recognition result.

An embodiment of the present invention further provides another speech recognition device. Referring also to FIG. 8, the device includes:

a speech receiving device 801, configured to receive speech;

a memory 802, configured to store a command word library, an acoustic model, a phonation dictionary, and a language model library; and a processor 803, configured to perform, according to the acoustic model, the phonation dictionary, and the language model library that are corresponding to the command word library, speech recognition on the speech received by the speech receiving device 801, to obtain a speech recognition result; if the speech recognition result is a preset flag command word, acquire a text file corresponding to the preset flag command word; if the speech recognition result is not a preset flag command word, execute an operation corresponding to the speech recognition result; extract, according to a predetermined rule, a command word from the text file corresponding to the preset flag command word, to obtain a command word list; compare the command word list with the command word library, to confirm whether the command word list includes a new command word, where the new command word is a command word that is included in the command word list but not included in the command word library; if the command word list includes the new command word, generate a corresponding new pronunciation dictionary according to the new command word and perform training to obtain a new language model; and merge the new language model into the language model library corresponding to the command word library.

Optionally, that the processor 803 is configured to acquire a text file corresponding to the preset flag command word includes: the processor 803 is configured to acquire a text file from an address corresponding to the preset flag command word, or acquire a text file that is corresponding to the preset flag command word and input by a user.

It should be noted that, in the foregoing device embodiments, the unit division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A speech recognition method, comprising:
   acquiring a text file and extracting a command word from the text file according to a predetermined rule, to obtain a command word list;
   generating a corresponding new pronunciation dictionary according to a new command word and performing training to obtain a new language model, wherein the new command word is a command word that is comprised in the command word list but not comprised in a command word library;
   merging the new language model into a language model library corresponding to the command word library;
   receiving speech and performing speech recognition on the speech according to an acoustic model, a phonation dictionary, and the merged language model library;
   obtaining a speech recognition result by means of the speech recognition;
   determining whether the speech recognition result is a preset flag command word; and
   if the speech recognition result is a preset flag command word, acquiring a text file corresponding to the preset flag command word.

2. The method according to claim 1, wherein acquiring a text file comprises:
   acquiring the text file from a specified address.

3. The method according to claim 1, wherein extracting a command word from the text file according to a predetermined rule, to obtain a command word list comprises:
   reading content of the text file, performing word segmentation on the content, and then selecting the command word from a word segmentation result according to the predetermined rule, to obtain the command word list.

4. A speech recognition method, comprising:
   acquiring a text file and extracting a command word from the text file according to a predetermined rule, to obtain a command word list;
   comparing the command word list with a command word library, to confirm whether the command word list comprises a new command word, wherein the new command word is a command word that is comprised in the command word list but not comprised in the command word library;
   if the command word list comprises the new command word, generating a corresponding new pronunciation dictionary according to the new command word and performing training to obtain a new language model;
   merging the new language model into a language model library corresponding to the command word library;
   receiving speech and performing speech recognition on the speech according to an acoustic model, a phonation dictionary, and the merged language model library;
   determining whether the text file changes; and
   if the text file changes, acquiring a changed text file.

5. The method according to claim 4, wherein acquiring a text file comprises:
   acquiring the text file from a specified address.

6. The method according to claim 4, wherein extracting a command word from the text file according to a predetermined rule, to obtain a command word list comprises:

reading content of the text file, performing word segmentation on the content, and then selecting the command word from a word segmentation result according to the predetermined rule, to obtain the command word list.

7. A speech recognition device, comprising:
a receiver configured to receive speech;
a memory configured to store instruction codes; and
a processor, upon executing the instruction codes, configured to:
acquire a text file;
extract, according to a predetermined rule, a command word from the text file, and obtain a command word list;
compare the command word list with a command word library, and confirm whether the command word list comprises a new command word, wherein the new command word is a command word that is comprised in the command word list but not comprised in the command word library;
if it is determined that the command word list comprises a new command word, generate a corresponding new pronunciation dictionary according to the new command word and perform training to obtain a new language model, and merge the new language model into a language model library corresponding to the command word library;
perform, according to an acoustic model, a phonation dictionary, and the merged language model library, speech recognition on the speech;
after completing the speech recognition, determine whether a speech recognition result is a preset flag command word;
if it is determined that the speech recognition result is a preset flag command word, acquire a text file corresponding to the preset flag command word; and
if it is determined that the speech recognition result is not a preset flag command word, execute an operation.

8. The device according to claim 7, wherein the processor is configured to:
acquire a text file from a specified address.

9. The device according to claim 7, wherein the processor is configured to:
read content of the text file;
perform word segmentation on the content; and
select the command word from a word segmentation result according to the predetermined rule, to obtain the command word list.

10. A speech recognition device, comprising:
a receiver configured to receive speech;
a memory configured to store instruction codes; and
a processor, upon executing the instruction codes, configured to:
acquire a text file;
extract, according to a predetermined rule, a command word from the text file, and obtain a command word list;
compare the command word list with a command word library, and confirm whether the command word list comprises a new command word, wherein the new command word is a command word that is comprised in the command word list but not comprised in the command word library;
if it is determined that the command word list comprises a new command word, generate a corresponding new pronunciation dictionary according to the new command word and perform training to obtain a new language model, and merge the new language model into a language model library corresponding to the command word library;
perform, according to an acoustic model, a phonation dictionary, and the merged language model library, speech recognition on the speech;
after completing the speech recognition, determine whether the text file changes;
if it is determined that the text file changes, acquire a changed text file; and
if it is determined that the text file not change, execute an operation.

11. The device according to claim 10, wherein the processor is further configured to:
acquire a text file from a specified address.

12. The device according to claim 10, wherein the processor is configured to:
read content of the text file;
perform word segmentation on the content; and
select the command word from a word segmentation result according to the predetermined rule, to obtain the command word list.

13. A speech recognition device, comprising:
a receiver, configured to receive speech;
a memory configured to store instruction codes; and
a processor, upon executing the instruction codes, configured to:
perform, according to an acoustic model, a phonation dictionary, and a language model library that are corresponding to a command word library, speech recognition on the speech received by the speech receiver, to obtain a speech recognition result;
determine whether the speech recognition result obtained by the recognizing unit is a preset flag command word;
it is determined that the speech recognition result is a preset flag command word, acquire a text file corresponding to the preset flag command word;
extract, according to a predetermined rule, a command word from the text file corresponding to the preset flag command word, to obtain a command word list;
compare the command word list with the command word library, and confirm whether the command word list comprises a new command word, wherein the new command word is a command word that is comprised in the command word list but not comprised in the command word library;
if it is determined that the command word list comprises a new command word, generate a corresponding new pronunciation dictionary according to the new command word and perform training to obtain a new language model, and merge the new language model into the language model library corresponding to the command word library.

14. The device according to claim 13, wherein the processor is configured to:
if it is determined that the speech recognition result is a preset flag command word, acquire a text file from an address corresponding to the preset flag command word, or acquire a text file that is corresponding to the preset flag command word.

* * * * *